United States Patent Office 3,324,041
Patented June 6, 1967

3,324,041
OIL-IN-WATER SETTABLE AQUEOUS EMULSIONS
Harry J. Sommer, Lafayette, and Warren C. Simpson, Berkeley, Calif., assignors to Shell Oil Company, New York, N.Y., a corporation of Delaware
No Drawing. Filed Jan. 17, 1964, Ser. No. 338,305
8 Claims. (Cl. 252—311.5)

This invention relates to novel aqueous emulsions and to their preparation. More particularly, the invention relates to oil-in-water emulsions wherein the dispersed phase comprises a polyepoxide and a bituminous material.

Specifically, the invention provides a process for preparing oil-in-water settable emulsions which comprises mixing (A) an aqueous emulsion comprising (1) a bituminous material, (2) an amino-containing polyamide prepared by reacting polyamines with polymerized fatty acids and further partly neutralized (i.e., the amino groups) with a suitable acid, such as mineral and/or water soluble organic acids, and (3) a non-reactive hydrogen bonding agent with (B) an aqueous emulsion comprising a polyepoxide and a nonionic emulsifier.

Oil-in-water emulsions of asphalt and polyepoxides have been prepared. While these emulsions have found wide use as bonding materials for glass mats, as paving materials, and as joint sealers, they generally have high viscosities and short pot lives which tend to unduly restrict their use. Thus, for example, it is very desirable to extend the pot life of such asphalt/polyepoxide emulsions for some applications.

It has now been unexpectedly discovered that the novel oil-in-water emulsions of the present invention not only have lower viscosities but have a longer usable pot life. Thus, this novel mixture of two emulsions will set up overnight at room temperature without the customary shrinkage due to normal water loss. In other words, the water of the emulsion is occluded or dispersed within the polyepoxide-asphalt. These properties of lower viscosity and low shrinkage make the novel emulsions of the present invention especially suitable for use for undersealing pavements, impermeabilization or water shut-off in oil and gas wells, as seal and tack coats, for binders for non-woven fabrics and in the production of asphalt/polyepoxide concretes. Also, insofar as the separate emulsions are not mixed until final use, each emulsion has an indefinite pot life. When the emulsions are mixed to form the final emulsion the pot life is approximately 16 hours at 70° F. Further, since the emulsions of the present invention are slightly basic (pH>7.0), their use in oil and gas wells are preferred over the acidic emulsions, particularly in limestone formations.

It is therefore the primary object of the present invention to provide novel oil-in-water emulsions and a process for preparing said emulsions which are very suitable for use in gas and oil wells where impermeabilization is desirable. It is another object to provide oil-in-water emulsions of asphalt and polyepoxides which have a longer pot life. These and other objects will become more apparent to one skilled in the art from the following disclosure.

These and other objects may be accomplished by the process of the present invention which comprises mixing (1) an aqueous emulsion comprising a bituminous material, a partially neutralized amino-containing polyamide prepared by reacting polyamines with polymerized fatty acids and a non-reactive hydrogen bonding agent with (2) an aqueous emulsion comprising a polyepoxide and a nonionic emulsifier. In other words, the oil-in-water emulsions of the present invention are prepared by mixing two aqueous emulsions.

The bituminous materials used in the compositions of the present invention include substances containing bitumens or pyrobitumens, pyrogeneous distillates and tar, pyrogeneous waxes and pyrogeneous residues (pitches and pyrogeneous asphalts). They are preferably composed mainly of hydrocarbons although they may contain amounts of sulfur, nitrogen and oxygen-containing materials. They also are preferably fusible and largely soluble in carbon disulfide. Examples of such bituminous materials may be found in Abraham's "Asphalts and Allied Substances," vol. I, page 57, 5th edition.

An especially preferred group of bituminous materials to be used in the compositions of the invention include the asphalts. These asphalts may be straight run, blown, cracked and catalytically or noncatalytically polymerized asphalts. All such asphalts are useful regardless of their original penetrations or softening points.

Especially preferred are the straight run asphalts used for paving, such as those having penetrations between 40 and 300 and softening points within the range from about 145° F. to about 95° F. Blown asphalts are normally produced in the presence or absence of catalysts by blowing asphalts or fluxes at elevated temperatures with an oxygen-containing gas such as air. Typical blown asphalt may have a softening point range of between about 300° F. and about 120° F. and a penetration within the range from about 100 to about 0.

Aromatic asphalts, such as those comprising the bottoms products from the distillation of catalytically cracked gas oil, are also preferred.

Other preferred materials include high boiling extracts of petroleum, such as those obtained by extracting petroleum with solvents having preferential selectivity for aromatic. To obtain such extracts various non-reactive, highly polar, aromatically preferential solvents are used such as liquid $SO_2$, phenol, cresylic acid, furfural, beta,beta-dichloroethyl ether, nitrobenzene and the like. The use of the so-called double solvent process employing mutually immiscible solvents like cresylic acid and propane also give suitable extracts. Especially preferred are the Edoleanu and furfural extracts of petroleum distillates, i.e., extracts obtained by use of liquid $SO_2$ or liquid $SO_2$ in combination with benzene, etc. The extracts are high-boiling materials which range in general from viscous liquids to tar-like materials at ordinary temperatures. Extracts boiling above 275° C. to 760 mm. Hg are preferred.

Another preferred group of bituminous materials include residual fuel oils, such as residual fuel oils having a viscosity from 10 cs. at 100° F. to about 1500 cs. at 100° F.

Also preferred are the products derived from coal such as coal tars, refined coal tars and coal tar pitches and preferably those having a softening point below 190° F. and a solubility in carbon disulfide of at least 50%. The expression "tar" as used herein refers to products obtained in connection with the destructive distillation of coal, including lignite and the like. When part of the volatile material is removed, the residue is termed "coal tar pitch." Residuals having a fusing point below about 90° F. are referred to herein as refined coal tars while those having fusing points of 90° F. or above are coal tar pitches. As used herein, in reference to coal tar products, "softening point" or "fusing point" refers to values obtained by the cube method as described in vol. II, Abraham, "Asphalts and Allied Substances," 5th edition. The coal products should possess at least 50% and preferably 75% solubility in carbon disulfide. The coal tar, refined coal tar and coal tar pitch may be acidic, basic or neutral, depending on whether the acid and/or bases have been removed. These coal products may be obtained from various types of bituminous coals, such as, for example, cannel, bog-peat, carbonite, and the like, and may be derived from various processes, such as from gas works, coke ovens, blast furnaces, gas producers and various low temperature processes. Description of examples of various coal tars, refined coal tars and coal tar pitches may be found on pages 384 to 405 of Abraham, "Asphalts and Allied Substances."

Particularly preferred coal derivatives to be used in preparing the compositions of the present invention include the residuals resulting from distillation of coal tar, and preferably refined coal tars having a fusing point of below 70° F. and a solubility in carbon disulfide of at least 75% with a specific gravity of 1.10 and 1.50 and low melting coal tar pitches having a fusing point below 120° F. and a solubility in carbon disulfide of at least 75%.

The amino-containing polyamides suitable for use in the present emulsions are those prepared by condensing an excess of a polyamine with a polymerized long chain fatty acid under generally known conditions.

Suitable polyamines may be aliphatic or aromatic and include, among others, ethylenediamine, trimethylenediamine, tetramethylenediamine, pentamethylenediamine, hexamethylenediamine, diethylenetriamine, triethylenetetramine, phenylenediamines, phenylenetriamines, and phenylenetetramines.

The polymerized unsaturated long chain fatty acids which are used to prepare the amino-containing polyamides are those obtained by polymerizing unsaturated long chain acids under known conditions, such as heat, peroxides and the like. Examples of long chain acids that may be used for this purpose include those containing at least 10 carbon atoms, and preferably more than 14 carbon atoms, such as, for example, dodecenedioic acid, 10,12-eicosadienedioic acid, tetradeceneoic acid, linoleic acid, linolenic acid, eleostearic acid and lincannic acid.

Normally, the polymerzation is effected by utilizing the lower aliphatic esters of the unsaturated acids so as to prevent decarboxylation during the heating period, and then removing the ester groups through hydrolysis. This process is illustrated in the Industrial and Engineering Chemistry article, page 1139, vol. 38 (1946). The structure of some of the polymerized acids are shown in Industrial and Engineering Chemistry, vol. 33, page 89 (1941).

Particularly preferred are the trimerized acids obtained from the ethylenically unsaturated fatty acids as derived from semi-drying and drying oils, and particularly, the conjugated fatty acids containing from 12 to 20 carbon atoms. The generic structure of the resulting trimerized acids is believed to be that of the following:

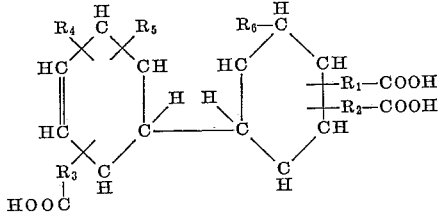

In the above formula, $R_1$, $R_2$ and $R_3$ constitute alkylene radicals having between 4 and 10 carbon atoms each, while $R_4$, $R_5$ and $R_6$ are alkyl radicals having between 4 and 10 carbon atoms each. Normally, the products will have the generic formula as follows:

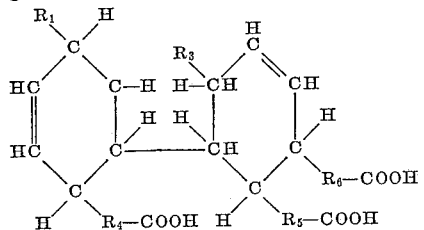

An especially suitable amino-containing polyamide is prepared by reacting diethylenetriamine with dimerized linseed oil.

Other suitable polyamides are those prepared and marketed by General Mills under the trade name of Versamid.

The polyamides are partially neutralized with a suitable acid. Suitable mineral acids include, among others, hydrochloric, hydrobromic, sulfuric and phosphoric. Of the mineral acids the monofunctional mineral acids such as hydrochloric acid are preferred. Suitable organic acids are the water soluble organic acids which include, among others, formic, acetic, propionic, butyric, oxalic, malonic, succinic, and the like. Acetic acid is especially preferred.

In general, from about 10% to about 50% of the polyamide is neutralized so as to form an emulsifying agent although up to 70% or 80% may be neutralized as desired for viscosity control. About 20% neutralization was found to be an especially suitable value.

The non-reactive hydrogen bonding agents suitable for use in the present invention are those compounds which are capable of hydrogen bonding but not reacting with the amine. Such non-reactive agents include, among others, water-insoluble alcohols such as abietyl, lauryl and stearyl; substituted phenols, such as nonylphenyl, dodecylphenol, didodecyl phenol and dinonylphenol; amides having the general formula

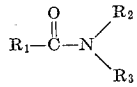

wherein $R_1$ is an alkyl group, and $R_2$ and $R_3$ represent hydrogen and/or alkyl groups, such as lauramide and substituted lauramide; esters such as dibutyl phthalate, dibutyl sebacate, dioctyl phthalate, octyl decyl phthalate, methyl acetyl ricinoleate, tributyl phosphate, tricresyl phosphate, triphenyl phosphate, methyl abietate and hydrogenated methyl abietate; and water insoluble ethers such as polyalkylene oxide derivatives.

The polyepoxide materials to be used in preparing the emulsions of the present invention comprise those organic materials which have more than one vic-epoxy group i.e., more than one

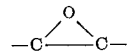

group, which group may be in a terminal position, i.e., a

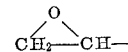

group, or in an internal position, i.e., a

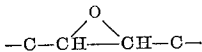

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides, include, among others, 1,4-bis(2,3-epoxypropoxy)benzene, 1, 3 - bis(2,3-epoxypropoxy)benzene, 4,4' - bis(2,3 - epoxypropoxy)diphenyl ether, 1,8-bis(2,3 - epoxypropoxy)octane, 1,4 - bis(2,3-epoxypropoxy)cyclohexane, 4,4' - bis(2-hydroxy - 3,4'-epoxybutoxy)diphenyl dimethylmethane, 1,3 - bis(4,5-epoxypentoxy - 5 - chlorobenzene, 1,4-bis(3,4-epoxybutoxy) - 2 - chlorocyclohexane, 1,3-bis(2-hydroxy-3,4-epoxybutoxy)benzene, 1,4-bis(2-hydroxy - 4,5 - epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)

propane (Bisphenol A), 2,2-bis(4-hydroxyphenyl)butane, 4,4'-dihydroxybenzophenone, bis(4 - hydroxyphenyl)ethane, 2,2-bis(4-hydroxyphenyl)pentane and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of suitable glycidyl polyethers is described in Shokal, U.S. 2,633,458. Polyethers A through E of U.S. 2,633,458 are examples of polyepoxides of the preferred type, but not limited thereto.

Another group of polyepoxides include the epoxy esters of polybasic acids, such as diglycidyl phthalate and diglycidyl adipate, diglycidyl tetrahydrophthalate, diglycidyl maleate, epoxidized dimethallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut and dehydrated castor oil, methyl linoleate, butyl linolinate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate, di(2,3-epoxybutyl) oxalate, di(2,3-epoxyhexyl)succinate, di(2,3-epoxyoctyl) tetrahydrophthalate, di(4,5 - epoxydodecyl)maleate, di-(2,3-epoxybutyl)terephthalate, di(2,3 - epoxypentyl)thiodipropionate, di(2,3-epoxybutyl)citrate and di(4,5-epoxyoctadecyl)malonate, as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12-diepoxyoctadecanedioate, dioctyl 10,11-diethyl - 8,9,12,13 - diepoxyeicosanedioate, dicyclohexyl 3,4,5,6-diepoxycyclohexane-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane 1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons, such as epoxidized 2,2-bis(cyclohexenyl)propane, 2,2-bis(cyclohexenyl)butane, 8,10-octadecadiene and the like.

The nonionic emulsifying agents or surfactants may be alkyl, alkylaryl ethers and thioethers as well as esters and amides. In general, the nonionic emulsifiers are composed of a hydrophobic or hydrocarbon portion and a hydrophilic portion which is a polyether chain usually terminated with an alcoholic hydroxyl group. Usually, the hydrophilic porton will contain repeating units of, say, 20 to 50 ether groups and the hydrophobic portion will contain alkyl groups of, say, about 7 to 12 carbon atoms. Particularly suitable is an octylphenol-ethylene oxide condensation product. Other suitable nonionic surfactants include those made by condensing ethylene oxide with alcohols such as nonyl, tetradecyl or alkylphenyls having alkyl groups of 6 to 15 carbon atoms. Other nonionic emulsifiers are made by condensing ethylene oxide with fatty acids whereby monoesters of polyethylene glycols are formed or by condensing unsubstituted amides with ethylene oxide whereby ether-alcohol amides are formed.

A particularly suitable nonionic surfactant is a lauryl alcohol-ethylene oxide condensate. The amount of nonionic emulsifier varies somewhat with the particular polyepoxide/asphalt system; however, it will generally be in the range of from about 0.5% to 20% by weight based on the weight of polyepoxide.

As noted hereinbefore the oil-in-water emulsions of the present invention are actually prepared by mixing an aqueous bituminous emulsion with an aqueous polyepoxide emulsion.

The polyamide/bituminous emulsion may be prepared by mixing (A) an oil phase comprising (1) a bituminous material, (2) a partially neutralized amino-containing polyamide and (3) a non-reactive bonding agent, said oil phase being at a temperature at which the bituminous material is liquid or at least semi-viscous, with (B) an aqueous phase consisting of water at a temperature of from about 125° to 210° F. Stable emulsions may be obtained with a wide range of the components, but in general, the polyepoxide/bituminous emulsion preferably contains from about 40–60 parts water, from about 20–40 parts by weight bituminous material, from about 10–20 parts by weight amino-containing polyamide and from about 0.5 tod 5 parts by weight non-reactive bonding agent. Generally, it is preferable to utilize an emulsion temperature below about 200° F. and more preferably below 180° F.

The second emulsion is simply prepared by mixing a polyepoxide and a nonionic emulsion into a water phase. In most instances the pH of the emulsion is adjusted to a value greater than 7 by the addition of NaOH. Although a wide latitude of proportions may be employed, very suitable ranges include from about 40–60 parts by weight, polyepoxide, from about 40–60 parts by weight of water and from 0.5 to 10 parts by weight of nonionic emulsifier.

These two separate aqueous emulsions, kept separate until final use, are mixed together by any suitable means, including the inversion, premix and colloid mill methods and applied to a surface or to an oil or gas well surface to impermeabilize the strata.

The various amounts of the components noted above in each of the emulsions are merely for general guidance since it is the final combined oil-in-water emulsion which is the particular emulsion of the present invention. The final emulsion is prepared so as to provide a weight ratio of polyamide to polyepoxide of from about 1:1 to about 4:1 with a ratio of about 2:1 being especially preferred. Thus, a preferred final polyepoxide/bituminous emulsion comprises from about 20–35 parts by weight bituminous material, from about 10–18 parts by weight of polyamide, from about 5–10 parts by weight of polyepoxide, from about 40–60 parts by weight of water, from about 0.5 to 2 parts by weight non-reactive bonding agent and from about 0.1 to 1 part by weight nonionic emulsifier.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages are by weight.

EXAMPLE I

This example illustrates the preparation of a preferred oil-in-water bituminous/polyepoxide emulsion.

Bituminous emulsion

An oil phase consisting of 65.1 parts of 85/100 penetration asphalt, 32.6 parts of Versamid 125 (a viscous, honey-colored liquid polyamide having a molecular weight of 765; a viscosity at 100° F. of 29,100 cs., at 210° F. of 508 cs.; total amine, 0.58 eq./100 g.; primary amine, 0.49 eq./100 g.; total nitrogen, 12.2% w.; and prepared by condensing diethylene triamine with dimer fatty acids) and 2.3 parts of glacial acetic acid at 190° F. was mixed with an aqueous phase, i.e., water at 160° F., to form a final bituminous emulsion:

| | |
|---|---|
| Asphalt _____Percent__ | 32.3 |
| Polyamide _____do____ | 16.5 |
| Acetic acid _____do____ | 1.1 |
| Water _____do____ | 50.1 |
| pH at 77° F. _____ | 9.2 |

Polyepoxide emulsion

A polyepoxide emulsion was prepared by mixing 49 parts of Polyether A (U.S. 2,633,458), 2 parts of a nonionic emulsifier (lauryl alcohol-ethylene oxide condensate) and 49 parts of water. The pH was adjusted to about 7.2 by the addition of NaOH.

Bituminous/polyepoxide emulsion

The two previously prepared emulsions were mixed together so that the final emulsion had a polyamide to polyepoxide ratio of 2:1. The bituminous/polyepoxide emulsion had the following composition:

| | Percent |
|---|---|
| Asphalt _____ | 35.5 |
| Polyamide partial acetate _____ | 19.0 |
| Emulsifier, nonionic _____ | 0.4 |
| Polyepoxide _____ | 8.9 |
| Water _____ | 36.2 |

This polyepoxide/asphalt emulsion is particularly suitable for use in sealing oil well formations because of its useful pot life and low shrinkage as well as retention of water upon setting-up.

EXAMPLE II

The procedure of Example I is essentially repeated wherein the bituminous material is one of the following: a 200/300 penetration asphalt, refined coal tar, extract of petroleum distillate (Dutrex 998), a residual fuel oil and bottoms obtained from the distillation of a catalytically cracked gas oil.

EXAMPLE III

The procedure of Example I was essentially repeated wherein the emulsions had the following compositions (part by weight):

Bituminous emulsion

| | |
|---|---|
| 200/300 penetration asphalt _____ | 29.0 |
| Dinonylphenol _____ | 3.8 |
| Versamid 125 _____ | 16.6 |
| Acetic acid _____ | 1.2 |
| Water _____ | 49.4 |

Polyepoxide emulsion

| | |
|---|---|
| Polyepoxide (Polyether A of U.S. 2,633,458) _____ | 49 |
| Nonionic emulsifier (lauryl alcohol-ethylene oxide condensate) _____ | 2 |
| Water _____ | 49 |
| pH (adjusted by NaOH) _____ | 7.3 |

Polyepoxide/asphalt emulsion

| | |
|---|---|
| Asphalt _____ | 24.8 |
| Dinonylphenol _____ | 3.2 |
| Emulsifier, nonionic _____ | 0.2 |
| Polyepoxide _____ | 7.1 |
| Water _____ | 49.4 |
| Versamid partial acetate _____ | 15.3 |

This polyepoxide/asphalt emulsion was very effective in consolidating a loose, fine gravel-sand mixture; within 20 hours the mixture permeated with the emulsion became solid and exhibited no shrinkage in drying at 140° F. for one week.

EXAMPLE IV

The procedure of Example III is substantially repeated wherein the polyepoxide is Polyether D of U.S. 2,633,458, the asphalt is an 85/100 penetration asphalt, the non-reactive bonding agent is abietyl alcohol, the nonionic emulsifier is an octylphenolethylene oxide condensate and the polyamide is an ethylenediamine-dimerized long chain fatty acids reaction product. The final polyepoxide emulsion has the following composition:

| | Percent |
|---|---|
| Polyepoxide _____ | 9.1 |
| Asphalt _____ | 28.3 |
| Abietyl alcohol _____ | 0.9 |
| Nonionic emulsifier _____ | 0.3 |
| Water _____ | 47.4 |
| Polyamide partial acetate _____ | 14.0 |
| | 100.0 |

Polyepoxide/asphalt concrete was prepared by mixing this emulsion with a loose, fine gravel-sand mixture (¼″ minus) at 70° F. and allowed to stand for 20 hours. The ratio of emulsion to aggregate was 1:6. The compacted mix exhibited stability properties, and showed no shrinkage on drying at 140° F. for 1 week.

EXAMPLE V

The procedure of Example I was substantially repeated wherein the acetic acid was replaced with an equivalent amount to achieve approximately 50% neutralization of the polyamide of each of the following: hydrochloric and formic acids. Similar stable settable emulsions were obtained:

EXAMPLE VI

The procedure of Example III is essentially repeated wherein the non-reactive bonding agent is one of the following: lauramide, tricresyl phosphate, methyl abietate and hydrogenated methyl abietate. Compacted mixes of these emulsions with loose, fine gravel-sand mixtures exhibit stability and show no shrinkage on drying at 140° F. for 1 week.

We claim as our invention:

1. An oil-in-water settable aqueous emulsion comprising (1) from 20–35 parts by weight of a bituminous material, (2) from 10–18 parts by weight of an amino-containing polyamide prepared by reacting polyamines with polymerized fatty acids and then partially neutralizing the amino groups with an acid selected from the group consisting of water-soluble organic acids and mineral acids, (3) from 5–10 parts by weight of a polyepoxide, (4) from 40–60 parts by weight of water, (5) from 0.5 to 2 parts by weight of a non-amino-reactive hydrogen bonding agent selected from the group consisting of (a) water-insoluble alcohols, (b) substituted phenols, (c) amides having the general formula:

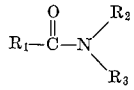

wherein $R_1$ is an alkyl group and $R_2$ and $R_3$ is selected from the group consisting of hydrogen and alkyl groups and (d) esters, and (6) from 0.1 to 1 part by weight of a nonionic emulsifier prepared by condensing ethylene oxide with a compound selected from the group consisting of (a) alcohols, (b) alkyl phenols having alkyl groups of from 6 to 15 carbon atoms, (c) fatty acids and (d) unsubstituted amides.

2. An emulsion as in claim 1 wherein the bituminous material is asphalt.

3. An emulsion as in claim 1 wherein the polyamide is prepared by reacting diethylenetriamine with dimerized linseed oil.

4. An emulsion as in claim 1 wherein from 10–50% of the amino-containing polyamide is neutralized with acetic acid.

5. An emulsion as in claim 1 wherein the non-reactive bonding agent is abietyl alcohol.

6. An emulsion as in claim 1 wherein the non-reactive bonding agent is dinonylphenol.

7. An emulsion as in claim 1 wherein the polyepoxide is a glycidyl polyether of 2,2-bis(4-hydroxyphenyl)propane.

8. An emulsion as in claim 1 wherein the nonionic emulsifier is a lauryl alcohol-ethylene oxide condensate.

References Cited

UNITED STATES PATENTS

| | | | |
|---|---|---|---|
| 2,442,972 | 6/1948 | Edelstein | 252—311.5 |
| 3,026,266 | 3/1962 | Mertens et al. | 252—311.5 |
| 3,249,412 | 5/1966 | Kolek et al. | 260—29.2 X |

FOREIGN PATENTS 248,697  12/1963  Australia.

LEON D. ROSDOL, *Primary Examiner.*

R. D. LOVERING, *Examiner.*